(12) United States Patent
Barakat et al.

(10) Patent No.: US 11,838,486 B1
(45) Date of Patent: Dec. 5, 2023

(54) METHOD AND DEVICE FOR PERSPECTIVE CORRECTION USING ONE OR MORE KEYFRAMES

(71) Applicant: Apple Inc., Cupertino, CA (US)

(72) Inventors: Samer Samir Barakat, Santa Clara, CA (US); Bertrand Nepveu, Los Altos, CA (US); Vincent Chapdelaine-Couture, Carignan (CA)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/927,763

(22) Filed: Jul. 13, 2020

Related U.S. Application Data

(60) Provisional application No. 62/904,957, filed on Sep. 24, 2019.

(51) Int. Cl.
*H04N 13/117* (2018.01)
*H04N 13/344* (2018.01)
*H04N 13/00* (2018.01)

(52) U.S. Cl.
CPC ......... *H04N 13/117* (2018.05); *H04N 13/344* (2018.05); *H04N 2013/0081* (2013.01)

(58) Field of Classification Search
USPC .......................................................... 348/43
See application file for complete search history.

(56) References Cited

U.S. PATENT DOCUMENTS

| | | | |
|---|---|---|---|
| 6,424,351 B1 * | 7/2002 | Bishop | G06T 15/04 345/427 |
| 10,237,531 B2 | 3/2019 | Boulton et al. | |
| 10,313,656 B2 | 6/2019 | Sadi et al. | |
| 2017/0061693 A1 * | 3/2017 | Kohler | G06T 19/00 |
| 2018/0012330 A1 | 1/2018 | Holzer et al. | |

FOREIGN PATENT DOCUMENTS

WO 2017/117675 A1 7/2017

* cited by examiner

*Primary Examiner* — Mikhail Itskovich
(74) *Attorney, Agent, or Firm* — Fernando & Partners LLP

(57) ABSTRACT

In one implementation, a method of performing perspective correction is performed at a head-mounted device including one or more processors, non-transitory memory, an image sensor, and a display. The method includes capturing, using the image sensor, a plurality of images of a scene from a respective plurality of perspectives. The method includes capturing, using the image sensor, a current image of the scene from a current perspective. The method includes obtaining a depth map of the current image of the scene. The method include transforming, using the one or more processors, the current image of the scene based on the depth map, a difference between the current perspective of the image sensor and a current perspective of a user, and at least one of the plurality of images of the scene from the respective plurality of perspectives. The method includes displaying, on the display, the transformed image.

20 Claims, 9 Drawing Sheets

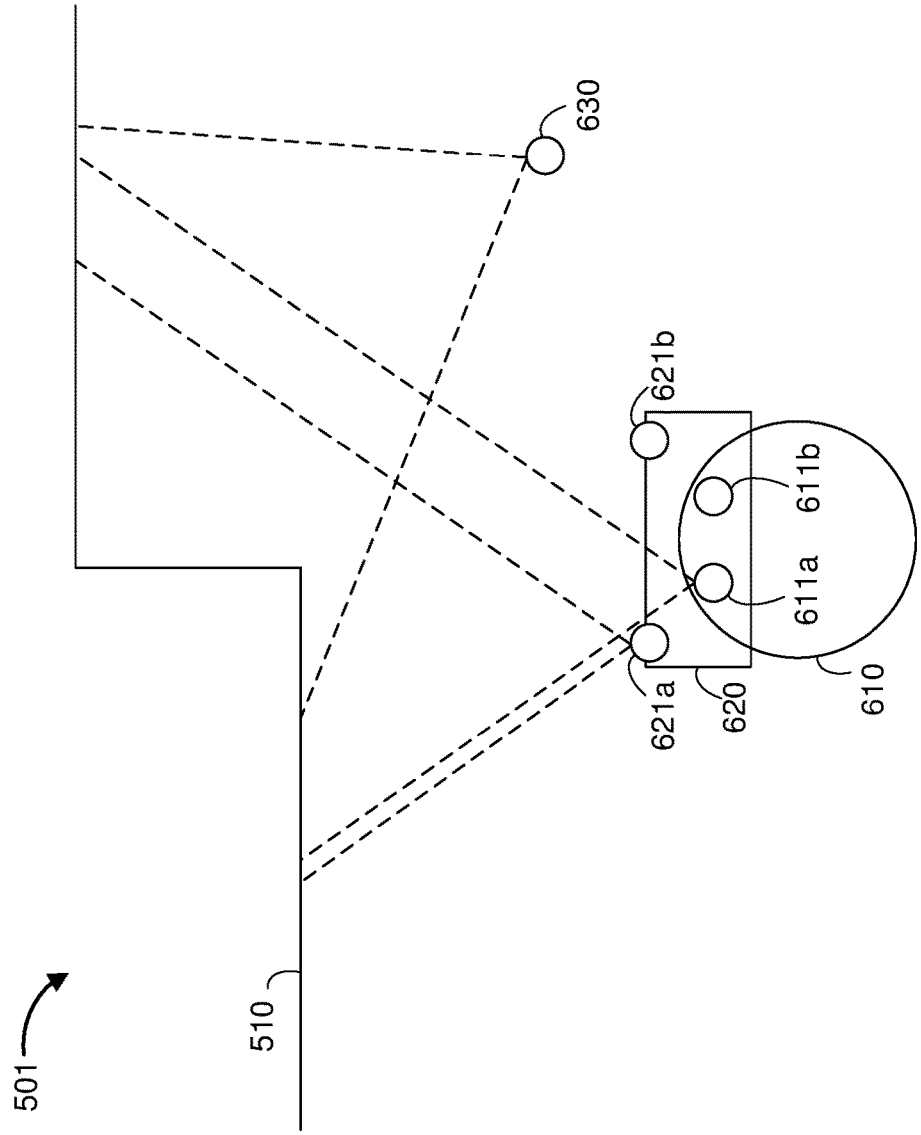

900

At a head-mounted device including one or more processors, non-transitory memory, an image sensor, and a display:

Capturing, using the image sensor, a plurality of images of a scene from a respective plurality of perspectives — 910

Capturing, using the image sensor, a current image of the scene from a current perspective — 920

Obtaining a depth map of the current image of the scene — 930

Transforming, using the one or more processors, the current image of the scene based on the depth map, a difference between the current perspective of the image sensor and a current perspective of a user, and at least one of the plurality of images of the scene from the respective plurality of perspectives — 940

Displaying, on the display, the transformed image — 950

Figure 9

METHOD AND DEVICE FOR PERSPECTIVE CORRECTION USING ONE OR MORE KEYFRAMES

CROSS-REFERENCE TO RELATED APPLICATIONS

This application claims priority to U.S. Provisional Patent App. No. 62/904,957, filed on Sep. 24, 2019, which is hereby incorporated by reference in its entirety.

TECHNICAL FIELD

The present disclosure generally relates to image processing and, in particular, to systems, methods, and devices for correcting a difference between a perspective of a scene camera and a perspective of a user in a computer-generated reality (CGR) environment.

BACKGROUND

A physical environment refers to a world that individuals can sense and/or with which individuals can interact without assistance of electronic systems. Physical environments (e.g., a physical forest) include physical elements (e.g., physical trees, physical structures, and physical animals). Individuals can directly interact with and/or sense the physical environment, such as through touch, sight, smell, hearing, and taste.

In contrast, a computer-generated reality (CGR) environment refers to an entirely or partly computer-created environment that individuals can sense and/or with which individuals can interact via an electronic system. In CGR, a subset of an individual's movements is monitored, and, responsive thereto, one or more attributes of one or more virtual objects in the CGR environment is changed in a manner that conforms with one or more physical laws. For example, a CGR system may detect an individual walking a few paces forward and, responsive thereto, adjust graphics and audio presented to the individual in a manner similar to how such scenery and sounds would change in a physical environment. Modifications to attribute(s) of virtual object(s) in a CGR environment also may be made responsive to representations of movement (e.g., audio instructions).

An individual may interact with and/or sense a CGR object using any one of his senses, including touch, smell, sight, taste, and sound. For example, an individual may interact with and/or sense aural objects that create a multi-dimensional (e.g., three dimensional) or spatial aural environment, and/or enable aural transparency. Multi-dimensional or spatial aural environments provide an individual with a perception of discrete aural sources in multi-dimensional space. Aural transparency selectively incorporates sounds from the physical environment, either with or without computer-created audio. In some CGR environments, an individual may interact with and/or sense only aural objects.

One example of CGR is virtual reality (VR). A VR environment refers to a simulated environment that is designed only to include computer-created sensory inputs for at least one of the senses. A VR environment includes multiple virtual objects with which an individual may interact and/or sense. An individual may interact and/or sense virtual objects in the VR environment through a simulation of a subset of the individual's actions within the computer-created environment, and/or through a simulation of the individual or his presence within the computer-created environment.

Another example of CGR is mixed reality (MR). A MR environment refers to a simulated environment that is designed to integrate computer-created sensory inputs (e.g., virtual objects) with sensory inputs from the physical environment, or a representation thereof. On a reality spectrum, a mixed reality environment is between, and does not include, a VR environment at one end and an entirely physical environment at the other end.

In some MR environments, computer-created sensory inputs may adapt to changes in sensory inputs from the physical environment. Also, some electronic systems for presenting MR environments may monitor orientation and/or location with respect to the physical environment to enable interaction between virtual objects and real objects (which are physical elements from the physical environment or representations thereof). For example, a system may monitor movements so that a virtual plant appears stationery with respect to a physical building.

One example of mixed reality is augmented reality (AR). An AR environment refers to a simulated environment in which at least one virtual object is superimposed over a physical environment, or a representation thereof. For example, an electronic system may have an opaque display and at least one imaging sensor for capturing images or video of the physical environment, which are representations of the physical environment. The system combines the images or video with virtual objects, and displays the combination on the opaque display. An individual, using the system, views the physical environment indirectly via the images or video of the physical environment, and observes the virtual objects superimposed over the physical environment. When a system uses image sensor(s) to capture images of the physical environment, and presents the AR environment on the opaque display using those images, the displayed images are called a video pass-through. Alternatively, an electronic system for displaying an AR environment may have a transparent or semi-transparent display through which an individual may view the physical environment directly. The system may display virtual objects on the transparent or semi-transparent display, so that an individual, using the system, observes the virtual objects superimposed over the physical environment. In another example, a system may comprise a projection system that projects virtual objects into the physical environment. The virtual objects may be projected, for example, on a physical surface or as a holograph, so that an individual, using the system, observes the virtual objects superimposed over the physical environment.

An augmented reality environment also may refer to a simulated environment in which a representation of a physical environment is altered by computer-created sensory information. For example, a portion of a representation of a physical environment may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical environment may be altered by graphically obscuring or excluding portions thereof.

Another example of mixed reality is augmented virtuality (AV). An AV environment refers to a simulated environment in which a computer-created or virtual environment incorporates at least one sensory input from the physical environment. The sensory input(s) from the physical environment may be representations of at least one characteristic of the physical environment. For example, a virtual object may assume a color of a physical element captured by imaging sensor(s). In another example, a virtual object may exhibit characteristics consistent with actual weather conditions in the physical environment, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various CGR environments. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical environment, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical environment (e.g., onto a physical surface or as a holograph). Other examples of CGR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback and/or cameras having hand tracking or other body pose estimation abilities), tablets, smartphones, and desktop or laptop computers.

In various implementations, a CGR environment is presented by a head-mounted device (HMD). Various HMDs include a scene camera that captures an image of the environment of the user (e.g., a scene) and a display that displays the image to the user. In some instances, this image or portions thereof can be combined with one or more virtual objects to present the user with a CGR experience. In other instances, the HMD can operate in a pass-through mode in which the image or portions thereof are presented to the user without the addition of virtual objects. Ideally, the image of the real world presented to the user is substantially similar to what the user would see if the HMD were not present. However, due to the different positions of the eyes, the display, and the camera in space, this may not occur, resulting in impaired distance perception, disorientation, and poor hand-eye coordination.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is an overhead perspective view of the scene of FIG. 5.

FIG. 7A.

FIG. 9 is a flowchart representation of a method of performing perspective correction of an image in accordance with some implementations.

Figure 1:
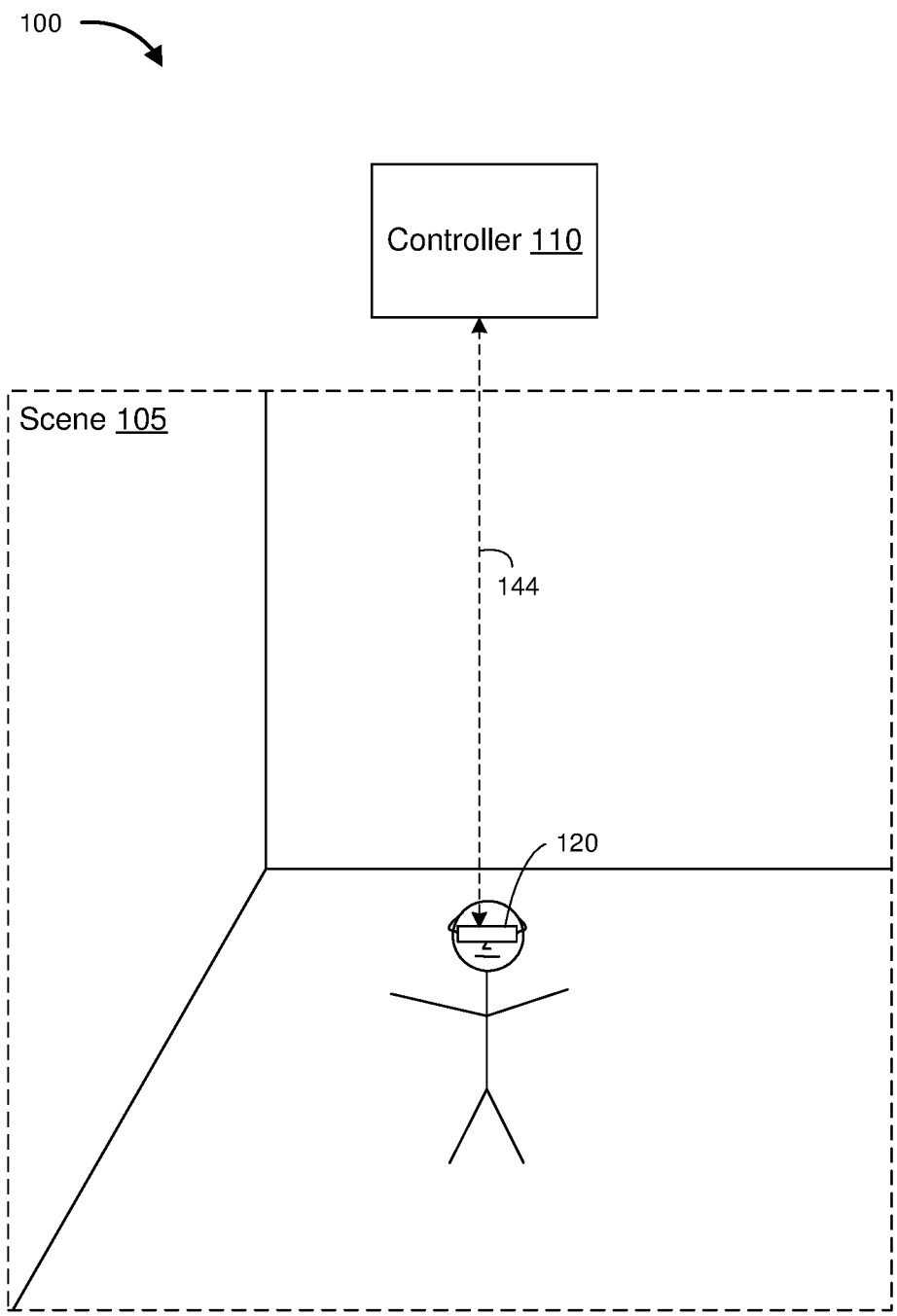
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing perspective correction. In various implementations, a method is performed by a device including a processor, non-transitory memory, an image sensor, and a display. The method includes capturing, using the image sensor, a plurality of images of a scene from a respective plurality of perspectives. The method includes capturing, using the image sensor, a current image of the scene from a current perspective. The method includes obtaining a depth map of the current image of the scene. The method includes transforming, using the one or more processors, the current image of the scene based on the depth map, a difference between the current perspective of the image sensor and a current perspective of a user, and at least one of the plurality of images of the scene from the respective plurality of perspectives. The method includes displaying, on the display, the transformed image.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in an HMD with a display and a scene camera, the image of the real world presented to the user on the display may not always reflect what the user would see if the HMD were not present due to the different positions of the eyes, the display, and the camera in space. In various circumstances, this results in poor distance perception, disorientation of the user, and poor hand-eye coordination, e.g., while interacting with the real world.

However, in various implementations, compensation for the different positions of the eyes, the display, and the camera is performed by transforming the image captured by the scene camera to make it appear as though it were captured at the same location as the eyes of the user (e.g., to make the captured image appear as though the user were viewing the scene while not wearing the HMD). Such a transformation may be incomplete as there may be objects in the field-of-view of the eye that are not in the field-of-view of the scene camera. This results in holes in the transformed image. However, in various implementations, these holes are filled using information from other images taken at other times.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120. According to some implementations, the HMD 120 presents CGR content to the user while the user is virtually and/or physically present within a scene 105.

In some implementations, the controller 110 is configured to manage and coordinate presentation of CGR content for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120.

In some implementations, the HMD 120 is configured to present the CGR content to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

In some implementations, the user wears the HMD 120 on his/her head. As such, the HMD 120 includes one or more CGR displays provided to display CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
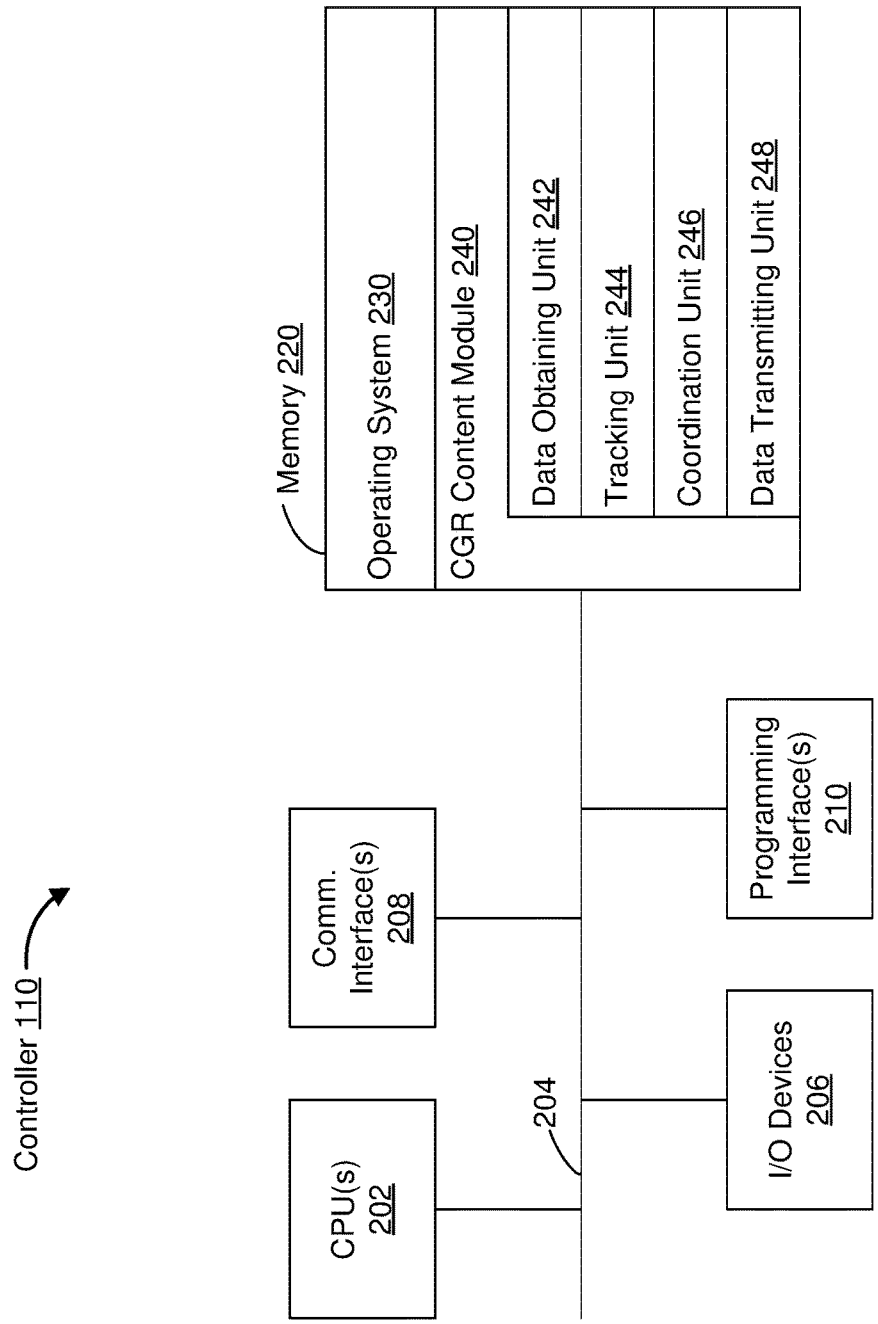
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR content module 240.

The operating system 230 includes procedures for handling various basic system services and for performing hardware dependent tasks. In some implementations, the CGR content module 240 is configured to manage and coordinate presentation of CGR content for one or more users (e.g., a single set of CGR content for one or more users, or multiple sets of CGR content for respective groups of one or more users). To that end, in various implementations, the CGR content module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120 of FIG. 1. To that end, in various implementations, the data obtaining unit 242 includes instructions and/or logic therefor, and heuristics and metadata therefor.

In some implementations, the tracking unit 244 is configured to map the scene 105 and to track the position, location, and/or orientation of at least the HMD 120 with respect to the scene 105 of FIG. 1. To that end, in various implementations, the tracking unit 244 includes instructions and/or logic therefor, and heuristics and metadata therefor.

In some implementations, the coordination unit 246 is configured to manage and coordinate the presentation of CGR content to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
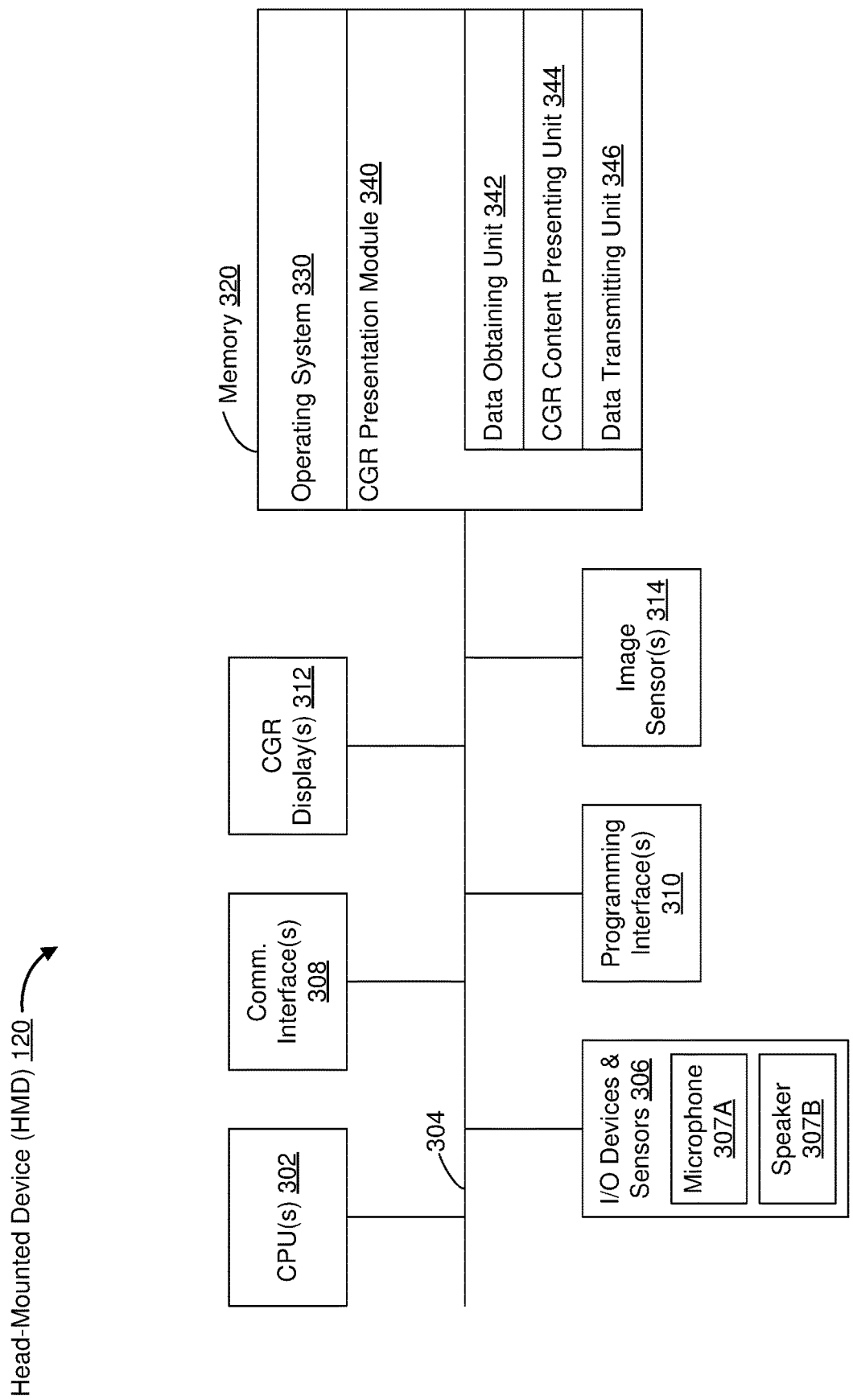
FIG. 3 is a block diagram of an example head-mounted device (HMD) in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more CGR displays 312 are configured to display CGR content to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting CGR content including pass-through video.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312 and/or the I/O devices and sensors 306 (such as the one or more speakers 307B). To that end, in various implementations, the CGR presentation module 340 includes a data obtaining unit 342, a CGR content presenting unit 344, and a data transmitting unit 346.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the CGR content presenting unit 344 is configured to present CGR content to a user. In various implementations, the CGR content presenting unit 344 presents a captured scene camera image that has been modified based on a difference between the perspective of the scene camera and the perspective of the user. To that end, in various implementations, the CGR content presenting unit 344 includes instructions and/or logic therefor, and heuristics and metadata therefor.

In some implementations, the data transmitting unit 346 is configured to transmit data (e.g., presentation data, location data, etc.) to at least the controller 110. To that end, in various implementations, the data transmitting unit 346 includes instructions and/or logic therefor, and heuristics and metadata therefor.

Although the data obtaining unit 342, the CGR content presenting unit 344, and the data transmitting unit 346 are shown as residing on a single device (e.g., the HMD 120 of FIG. 1), it should be understood that in other implementations, any combination of the data obtaining unit 342, the CGR content presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
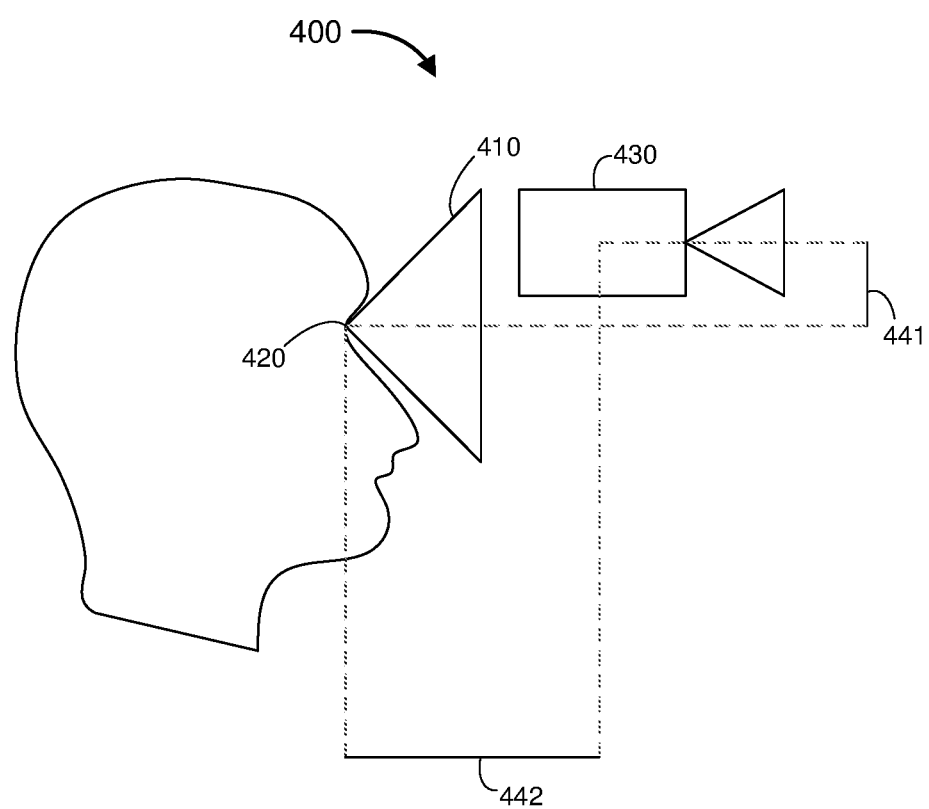
FIG. 4 illustrates an example scenario related to capturing a scene image and displaying the captured scene image in accordance with some implementations.

FIG. 4 illustrates an example scenario 400 related to capturing a scene image and displaying the captured scene image in accordance with some implementations. A user wears a device (e.g., the HMD 120 in FIG. 3) including a display 410 and a scene camera 430. The scene camera 430 captures an image of a scene (e.g., a picture of the physical environment in which the user is present) and the display 410 displays the image of the scene to the eyes 420 of the user. The scene camera 430 has a perspective (e.g., where the image sensor of the scene camera 430 is located) that is offset vertically from the perspective of the user (e.g., where the eyes 420 of the user are located) by a vertical offset 441. Further, the perspective of the scene camera 430 is offset longitudinally from the perspective of the user by a longitudinal offset 442. Further, in various implementations, the perspective of the scene camera 430 is offset laterally from the perspective of the user by a lateral offset (e.g., into or out of the page in FIG. 4).

Figure 5:
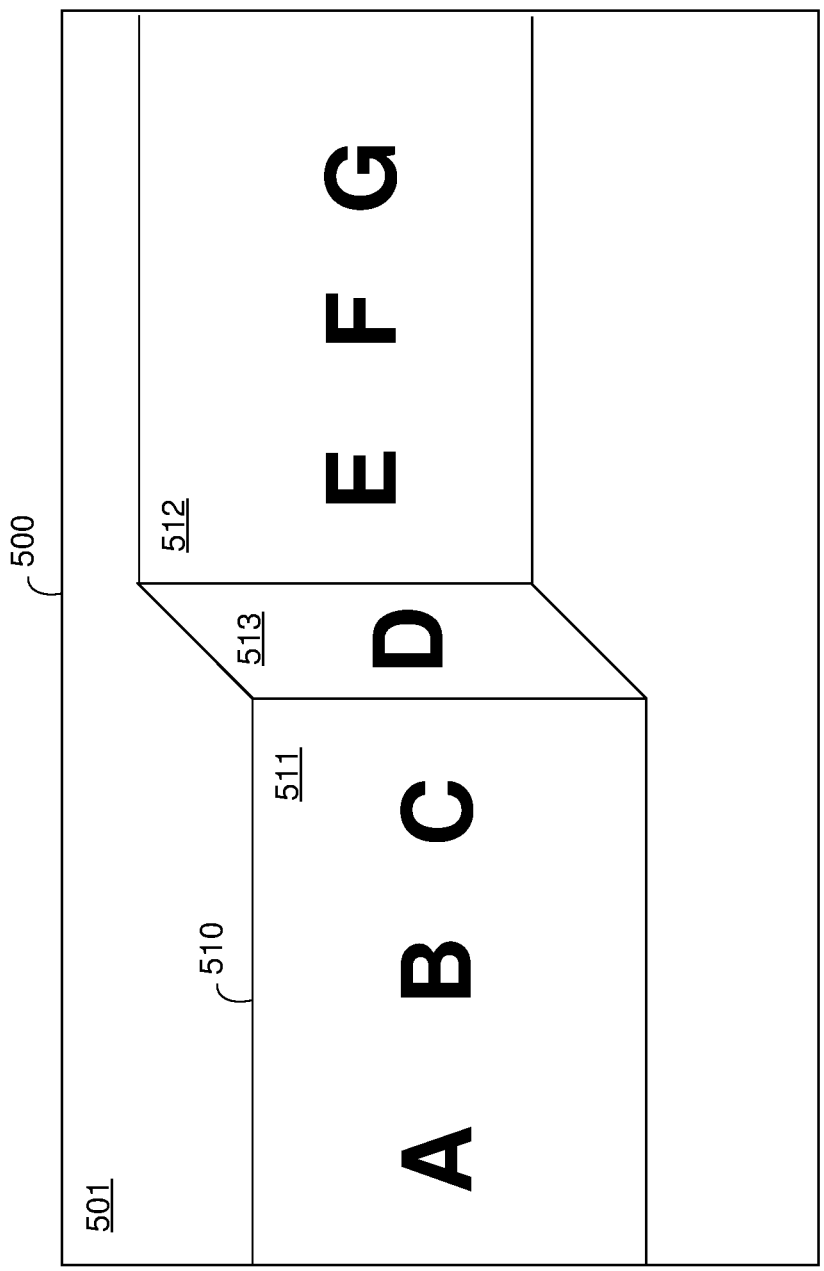
FIG. 5 is an image of scene captured by a scene camera from a particular perspective.

FIG. 5 is an image 500 of a scene 501 captured by a scene camera from a particular perspective. The scene 501 includes a structure 510 having a first surface 511 nearer to the scene camera, a second surface 512 further from the scene camera, and a third surface 513 connecting the first surface 511 and the second surface 512. The first surface 511 has the letters A, B, and C painted thereon, the third surface 513 has the letter D painted thereon, and the second surface 512 has the letters E, F, and G painted thereon.

From the particular perspective, the image 500 includes all of the letters painted on the structure 510. However, from other perspectives, as described below, a captured image may not include all the letters painted on the structure 510.

FIG. 6 is an overhead perspective view of the scene 501 of FIG. 5. The scene 501 includes the structure 510 and a user 610 wearing an HMD 620. The user 610 has a left eye 611a at a left eye location providing a left eye perspective. The user 610 has a right eye 611b at a right eye location providing a right eye perspective. The HMD 620 includes a left scene camera 621a at a left scene camera location providing a left scene camera perspective. The HMD 620 includes a right scene camera 621b at a right scene camera location providing a right scene camera perspective. Because the left eye 611a of the user 610 and the left scene camera 621a of the HMD 620 are at different locations, they each provide different perspectives of the scene.

The HMD 620 stores a keyframe image, described below, taken at an earlier time by the left scene camera 621a or the right scene camera 621b from a keyframe location 630 providing a keyframe perspective. Whereas FIG. 6 illustrates only a single keyframe location, in various implementations, the HMD 620 stores a plurality of keyframe images taken at earlier times from a plurality of different keyframe locations. In various implementations, to save storage space, the keyframe images are stored at a lower resolution than current images of the scene captured by the left scene camera 621a or the right scene camera 621b. In various implementations, the key frames images are compressed (with lossy or lossless compression) or otherwise reduced in size (e.g., stored as an image pyramid) as compared to current images of the scene captured by the left scene camera 621a or the right scene camera 621b.

Figure 7A:
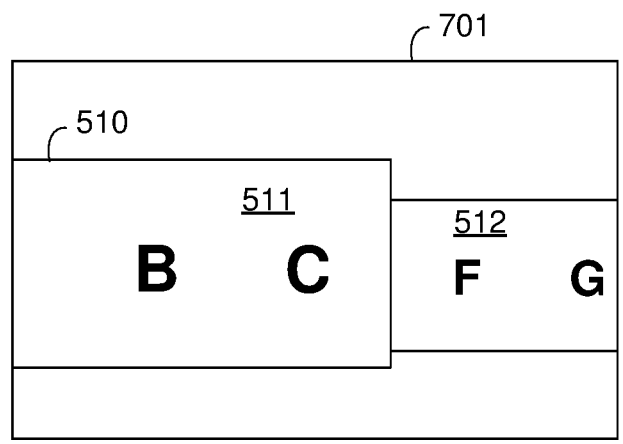
FIG. 7A illustrates a first image of the scene of FIG. 5 captured by a left scene camera.

FIG. 7A illustrates a first image 701 of the scene 501 captured by the left scene camera 621a. In the first image 701, the first surface 511 of the structure 510 and the second surface 512 of the structure 510 are present. The third surface 513 of the structure cannot be seen in the first image 701. On the first surface 511, the letters B and C can be seen, whereas the letter A is not in the field-of-view of the left scene camera 621a. Similarly, on the second surface 512, the letters F and G can be seen, whereas the letter E is not in the field-of-view of the left scene camera 621a.

Figure 7B:
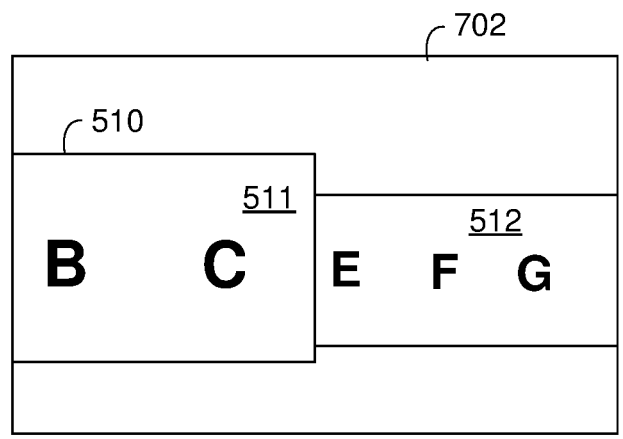
FIG. 7B illustrates a view of the scene of FIG. 5 as would be seen by the left eye of a user if the user were not wearing an HMD.

FIG. 7B illustrates a view 702 of the scene 501 as would be seen by the left eye 611a of the user 610 if the user 610 were not wearing the HMD 620. In the view 702, like the first image 701, the first surface 511 and the second surface 512 are present, but the third surface 513 is not. On the first surface 511, the letters B and C can be seen, whereas the letter A is not in the field-of-view of the left eye 611a. Similarly, on the second surface 512, the letters E, F, and G can be seen. Notably, in the view 702, as compared to the first image 701, the letter E is present on the second surface 512. Thus, the letter E is in the field-of-view of the left eye 611a, but not in the field-of-view of the left scene camera 621a.

Figure 7C:
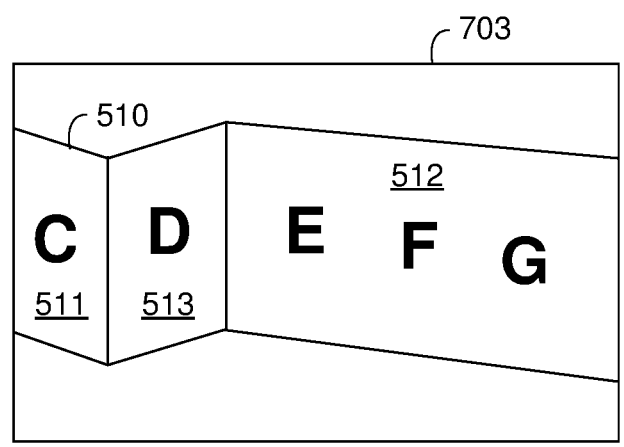
FIG. 7C illustrates a second image of the scene captured at an earlier time by a scene camera from a keyframe location.

FIG. 7C illustrates a second image 703 of the scene 501 captured at an earlier time by one of the scene camera 621a-621b from the keyframe location 630. In the second image 703, the first surface 511 of the structure 510, the second surface 512 of the structure 510, and the third surface 513 of the structure 510 are present. On the first surface 511, the letter C can be seen, whereas the letters A and B were not in the field-of-view of the one of the scene cameras 621a-621b. On the third surface 513, the letter D can be seen. On the second surface 512, the letters E, F, and G can be seen. Thus, whereas the letter E is not present in the first image 701, the letter E is present in the second image 703.

Figure 8A:
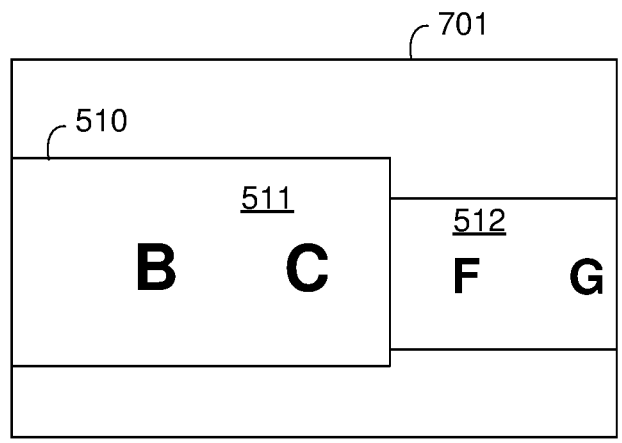
FIG. 8A illustrates the first image of FIG. 7A substantially as illustrated in FIG. 8B illustrates a transformed image generated by transforming the first image of FIG. 7A based on a depth map of the first image.

In various implementations, the HMD transforms the first image 701 to make it appear as though it was captured from the left eye perspective rather than the left scene camera perspective. FIG. 8A illustrates the first image 701 substantially as illustrated in FIG. 7A.

Figure 8B:
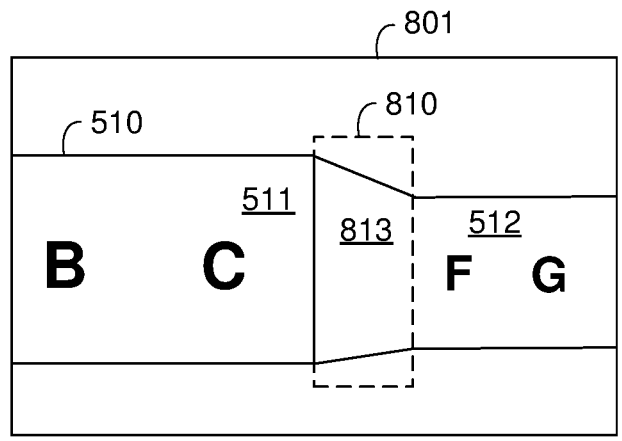
FIG. 8C illustrated a filled image generated by transforming the first image based on a depth map of the first image of FIG. 7A and filling the resulting hole with information from the second image of FIG. 7C.

FIG. 8B illustrates a transformed image 801 generated by transforming the first image 701 based on a depth map of the first image 701 and a difference between the left scene camera perspective and the left eye perspective. The depth map represents, for each pixel of the first image 701, an estimated distance between the left scene camera 621a and the object represented by the pixel, e.g., the particular location of the structure 610. In various implementations, the transformation is a projective transformation.

In the transformed image 801, the first surface 511 of the structure 510 and the second surface 512 of the structure 510 are present. On the first surface 511, the letters B and C can be seen. Similarly, on the second surface 512, the letters F and G can be seen. The projective transformation leaves a hole 810 in the transformed image 801 corresponding to pixel locations for which the first image 701 provides no information. In various implementations, the pixel values for pixels in the hole can be determined using interpolation. Thus, in FIG. 8B, the transformed image 801 includes an artificial third surface 813 between the first surface 511 and the second surface 512.

Thus, whereas the view 702 does not includes the third surface 513 of the structure, the transformed image 801 incorrectly includes an artificial third surface 813. Further, whereas the view 702 includes the letter E on the second surface 512, the transformed image 801 incorrectly fails to include the letter E on the second surface 512.

In various implementations, rather than filling the hole 810 using interpolation, pixel values from another image from a different perspective is used, e.g., from a keyframe image.

Figure 8C:
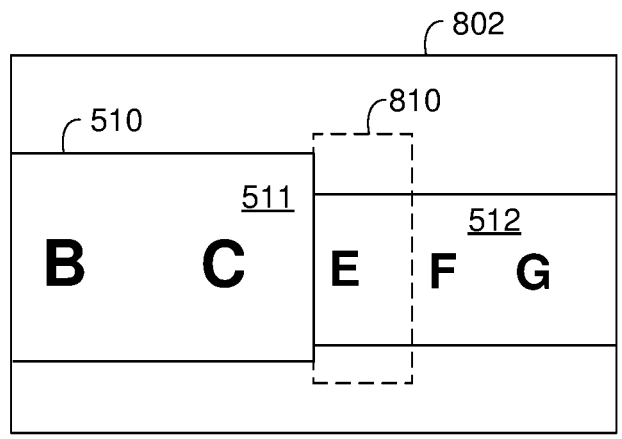

FIG. 8C illustrated a filled image 802 generated by transforming the first image 701 based on a depth map of the first image 701 and a difference between the left scene camera perspective and the left eye perspective and filling the resulting hole 810 with information from the second image 703. In various implementations, the information from the second image 703 is generated by transforming the second image 703 based on a depth map of the second image 703 and a difference between the keyframe perspective and the left eye perspective.

In the filled image 802, the first surface 511 of the structure 510 and the second surface 512 of the structure 510 are present. On the first surface 511, the letters B and C can be seen. Similarly, on the second surface 512, the letters E, F, and G can be seen. Whereas the projective transformation leaves a hole 810 in the transformed image 801 corresponding to pixel locations for which the first image 701 provides no information, the second image 702 provides this information (e.g., that the letter E is present on the second surface 512).

Thus, whereas the view 702 does not includes the third surface 513 of the structure, the filled image 802 also does not include the third surface 813. Further, whereas the view 702 includes the letter E on the second surface 512, the filled image 802 correctly includes the letter E on the second surface 512. Thus, the filled image 802 appears substantially similar to the view 702 or, at least, is more similar to the view 702 than the first image 701 or the transformed image 801.

FIG. 9 is a flowchart representation of a method of performing perspective correction of an image in accordance with some implementations. In various implementations, the method 900 is performed by a device with one or more processors, non-transitory memory, an image sensor, and a display (e.g., the HMD 120 of FIG. 3). In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, in block 910, with the device capturing, using the image sensor, a plurality of images of a scene from respective plurality of perspectives. Accordingly, as a user moves around a scene, a scene camera captures a plurality of keyframe images that are used to fill holes in transformed images.

In various implementations, the plurality of images of the scene includes a first set of images captured periodically. For example, in various implementations, a scene camera of an HMD captures a scene camera image every ten seconds and stores the scene camera images in a first buffer, e.g., first-in/first-out buffer.

In various implementations, the plurality of images of the scene includes a second set of images from sufficiently different perspectives. For example, in various implementations, a scene camera of an HMD captures a first scene camera image from a first perspective and stores the first scene camera image in a second buffer. As the scene camera continues to capture scene camera images from different perspectives, a scene camera image is added to the second buffer if the perspective of the scene camera image is sufficiently different than those already stored in the second buffer. In various implementations, the perspective is sufficiently different than the perspective of a scene camera image stored in the second buffer if the distance between the respective perspectives is greater than a threshold. In various implementations, the perspective is sufficiently different than the perspective of a scene camera image stored in the second buffer if the scene camera images are sufficiently different (e.g., as determined by a normalized cross-correlation or other similarity metric.)

The method 900 continues, in block 920, with the device capturing, using the image sensor, a current image of the scene from a current perspective. In various implementations, to save storage space, the plurality of images of the scene are stored at a lower resolution than the current image of the scene. In various implementations, the plurality of images of the scene are compressed (with lossy or lossless compression) or otherwise reduced in size (e.g., stored as an image pyramid) as compared to the current image of the scene.

The method 900 continues, in block 930, with the device obtaining a depth map of the current image of the scene. In various implementations, the depth map represents, for each pixel of the current image, an estimated distance between the image sensor and an object represented by the pixel.

In various implementations, the depth map of the current image of the scene is obtained using a depth sensor. In various implementations, the depth map of the current image of the scene is obtained using stereo matching, e.g., using the current image of the scene as captured by a left scene camera and another image of the scene captured by a right scene camera.

In various implementations, the depth map of the current image of the scene is obtained based on one or more of the plurality of images of the scene, e.g., performing stereo matching using the current image of the scene and one or more of the plurality of images of the scene.

The method 900 continues, in block 940, with the device transforming, using the one or more processors, the current image of the scene based on the depth map, a difference between the current perspective of the image sensor and a current perspective of a user, and at least one of the plurality of images of the scene from the respective plurality of perspectives.

In various implementations, the device performs a projective transformation based on the depth map and the difference between the current perspective of the image sensor and the current perspective of the user, generating a holed image including a hole.

In various implementations, the projective transformation is a forward mapping in which, for each pixel of the image of the scene at a pixel location in an untransformed space, a new pixel location is determined in a transformed space of the transformed image. In various implementations, the projective transformation is a backwards mapping in which, for each pixel of the transformed image at a pixel location in a transformed space, a source pixel location is determining in an untransformed space of the image of the scene.

In various implementations, the source pixel location is determined according to the following equation in which $x_{cam}$ and $y_{cam}$ are the pixel location in the untransformed space, $x_{eye}$ and $y_{eye}$ are the pixel location in the transformed space, $P_{eye}$ is a 4×4 view projection matrix of the eye representing the current perspective of the user, $P_{cam}$ is a 4×4 view projection matrix of the scene camera representing the current perspective of the scene camera, and d is the depth map value at the pixel location:

$$\begin{bmatrix} x_{cam} \\ y_{cam} \\ 1 \end{bmatrix} \leftarrow P_{cam} \cdot P_{eye}^{-1} \cdot \begin{bmatrix} x_{eye} \\ y_{eye} \\ 1 \\ \left(\frac{1}{d}\right) \end{bmatrix}$$

In various implementations, the source pixel location is determined using the above equation for each pixel in the image of the scene. In various implementations, the source pixel location is determined using the above equation for less than each pixel of the image of the scene.

In various implementations, the device determines the view projection matrix of the eye and the view projection matrix of the scene camera during a calibration and stores data indicative of the view projection matrices (or their product) in a non-transitory memory. The product of the view projection matrices is a transformation matrix represents a difference between the current perspective of the image sensor and the current perspective of the user.

Thus, in various implementations, transforming the image of the scene includes determining, for a plurality of pixels of the transformed image having respective pixel locations, a respective plurality of source pixel locations. In various implementations, determining the respective plurality of source pixel locations includes, for each of the plurality of pixels of the transformed image, multiplying a vector including the respective pixel location and the multiplicative inverse of the element of the depth map at the pixel location by a transformation matrix representing the difference between the current perspective of the image sensor and the current perspective of the user.

Using the source pixel locations in the untransformed space and the pixel values of the pixels of the image of the scene, the device generates a holed image using interpolation or other techniques. However, in various implementations, for pixel locations in the transformed image in a relatively large area referred to as hole, no source pixel location can be determined or the source pixel locations do not differ enough to provide different pixel values.

Accordingly, in various implementations, the device generates a filled image based on the holed image by filling the hole using at least one of the plurality of images of the scene from the respective plurality of perspectives.

In various implementations, a first one of the plurality of images from a first one of the respective plurality of perspectives is selected based on the similarity of the first one of the respective plurality of perspectives to the current perspective of the user, e.g., the keyframe captured at the location closest to the current location of the eye of the user is selected. The first one of the plurality of images is transformed based on a depth map of the first one of the plurality of images and the difference between the first one of the plurality of perspectives and the current perspective of the user, generating a fill image. The pixels corresponding to the hole of the fill image are copied into the corresponding pixels of the holed image to generate a filled image.

In various implementations, the fill image itself has a hole. If this hole overlaps the hole of the holed image, a second one of the plurality of images from a second one of the respective plurality of perspectives may be used to generate a supplemental fill image which is used to fill the overlapping region.

Thus, in various implementations, the method 900 includes determining that the fill image includes a hole that at least partially overlaps the hole of the holed image in an overlap region. The method 900 includes, in response to determining that the fill image includes a hole that at least partially overlaps the hole of the holed image in an overlap region, selecting a second one of the plurality of images from a second one of the respective plurality of perspectives, generating a supplemental fill image by transforming the second one of the plurality of images based on a depth map of the second one of the plurality of images and a difference between the second one of the plurality of perspectives and the current perspective of the user, and copying pixels of the supplemental fill image corresponding to the overlap region to corresponding pixels of the holed image.

The method 900 continues, in block 950, with the device displaying, on the display, the transformed image. In various implementations, the transformed image includes CGR content. In some implementations, CGR content is added to the current image of the scene before the transformation (at block 940). In some implementations, CGR content is added to the transformed image. In various implementations, the device determines whether to add the CGR content to the image of the scene before or after the transformation based on metadata indicative of the CGR content's attachment to the scene. In various implementations, the device determines whether to add the CGR content to the image of the scene before or after the transformation based on an amount of CGR content (e.g., a percentage of the image of the scene containing CGR content).

In various implementations, the device determines whether to add the CGR content to the image of the scene before or after the transformation based on metadata indicative of a depth of the CGR content. Accordingly, in various implementations, the method 900 includes receiving CGR content and CGR content metadata, selecting the image of the scene or the transformed image based on the CGR content metadata, and adding the CGR content to the selection.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a head-mounted device including one or more processors, non-transitory memory, an image sensor, and a display:
   capturing, using the image sensor, a current image of a physical environment from a current perspective of the image sensor;
   obtaining a depth map of the current image of the physical environment;
   selecting, from a plurality of previously captured images of the physical environment, a first previously captured image that was captured from a first perspective of the image sensor in response to determining that the first perspective of the image sensor corresponds to a location that is closer to a current location of an eye of the user than respective locations of a remainder of the plurality of previously captured images;
   generating a fill image by transforming the first previously captured image based on a difference between the first perspective of the image sensor and the current perspective of the image sensor, wherein the fill image includes pixels corresponding to a portion of an object that is missing from the current image;
   generating a transformed image of the physical environment from a current perspective of a user by transforming, using the one or more processors, the current image of the physical environment based on the depth map, a difference between the current perspective of the image sensor and the current perspective of the user, and the pixels corresponding to the portion of the object in the fill image; and
   displaying, on the display, the transformed image.

2. The method of claim 1, wherein the plurality of previously captured images of the physical environment includes a set of images captured periodically.

3. The method of claim 1, wherein the plurality of previously captured images of the physical environment includes a set of images from sufficiently different perspectives.

4. The method of claim 1, wherein the plurality of previously captured images of the physical environment are stored at a lower resolution than the current image of the physical environment.

5. The method of claim 1, wherein the depth map of the current image of the physical environment is obtained based on one or more of the plurality of previously captured images of the physical environment.

6. The method of claim 1, wherein transforming the current image of the physical environment comprises:
generating a holed image of the physical environment including a hole by transforming the current image of the physical environment based on the depth map and the difference between the current perspective of the image sensor and the current perspective of the user; and
generating a filled image of the physical environment based on the holed image of the physical environment by filling the hole using the pixels corresponding to the portion of the object in the fill image.

7. The method of claim 6, wherein generating the filled image of the physical environment comprises:
copying pixels of the fill image of the physical environment corresponding to the hole to corresponding pixels of the holed image.

8. The method of claim 7, further comprising:
determining that the fill image of the physical environment includes a hole that at least partially overlaps the hole of the holed image of the physical environment; and
in response to determining that the fill image of the physical environment includes a hole that at least partially overlaps the hole of the holed image of the physical environment in an overlap region:
selecting a second previously captured image of the physical environment that was captured from a second perspective of the image sensor;
generating a supplemental fill image of the physical environment by transforming the second previously captured image of the physical environment based on a depth map of the second previously captured image of the physical environment and a difference between the second perspective of the image sensor and the current perspective of the user; and
copying pixels of the supplemental fill image of the physical environment corresponding to the overlap region to corresponding pixels of the holed image.

9. The method of claim 1, wherein the transformed image of the physical environment includes computer-generated reality (CGR) content.

10. A device comprising:
an image sensor;
a display;
a non-transitory memory; and
one or more processors to:
capture, using the image sensor, a current image of a physical environment from a current perspective of the image sensor;
obtain a depth map of the current image of the physical environment;
select, from a plurality of previously captured images of the physical environment, a first previously captured image that was captured from a first perspective of the image sensor in response to determining that the first perspective of the image sensor corresponds to a location that is closer to a current location of an eye of the user than respective locations of a remainder of the plurality of previously captured images;
generate a fill image by transforming the first previously captured image based on a difference between the first perspective of the image sensor and the current perspective of the image sensor, wherein the fill image includes pixels corresponding to a portion of an object that is missing from the current image;
generate a transformed image of the physical environment from a current perspective of a user by transforming, using the one or more processors, the current image of the physical environment based on the depth map, a difference between the current perspective of the image sensor and the current perspective of the user, and the pixels corresponding to the portion of the object in the fill image; and
display, on the display, the transformed image of the physical environment.

11. The device of claim 10, wherein the plurality of previously captured images of the physical environment includes a set of images captured periodically and/or from sufficiently different perspectives.

12. The device of claim 10, wherein the plurality of previously captured images of the physical environment are stored at a lower resolution than the current image of the physical environment.

13. The device of claim 10, wherein the depth map of the current image of the physical environment is obtained based on one or more of the plurality of previously captured images of the physical environment.

14. The device of claim 10, wherein the one or more processors are to transform the current image of the physical environment by:
generating a holed image of the physical environment including a hole by transforming the current image of the physical environment based on the depth map and the difference between the current perspective of the image sensor and the current perspective of the user; and
generating a filled image of the physical environment based on the holed image of the physical environment by filling the hole using the pixels corresponding to the portion of the object in the fill image.

15. The device of claim 14, wherein the one or more processors are to generate the filled image by:
copying pixels of the fill image of the physical environment corresponding to the hole to corresponding pixels of the holed image of the physical environment.

16. The device of claim 15, wherein the one or more processors are further to:
determine that the fill image of the physical environment includes a hole that at least partially overlaps the hole of the holed image of the physical environment; and
in response to determining that the fill image of the physical environment includes a hole that at least partially overlaps the hole of the holed image of the physical environment in an overlap region:
select a second previously captured image of the physical environment that was captured from a second perspective of the image sensor;
generate a supplemental fill image of the physical environment by transforming the second previously captured image of the physical environment based on a depth map of the second previously captured image of the physical environment and a difference between the second perspective of the image sensor and the current perspective of the user; and copy pixels of the supplemental fill image of the physical environment corresponding to the overlap region to corresponding pixels of the holed image of the physical environment.

17. The device of claim 10, wherein the transformed image of the physical environment includes computer-generated reality (CGR) content.

18. A non-transitory memory storing one or more programs, which, when executed by one or more processors of a device with an image sensor and a display, cause the device to:

capture, using the image sensor, a current image of a physical environment from a current perspective of the image sensor;

obtain a depth map of the current image of the physical environment;

select, from a plurality of previously captured images of the physical environment, a first previously captured image that was captured from a first perspective of the image sensor in response to determining that the first perspective of the image sensor corresponds to a location that is closer to a current location of an eye of the user than respective locations of a remainder of the plurality of previously captured images;

generate a fill image by transforming the first previously captured image based on a difference between the first perspective of the image sensor and the current perspective of the image sensor, wherein the fill image includes pixels corresponding to a portion of an object that is missing from the current image;

generate a transformed image of the physical environment from a current perspective of a user by transforming, using the one or more processors, the current image of the physical environment based on the depth map, a difference between the current perspective of the image sensor and a current perspective of the user, and the pixels corresponding to the portion of the object in the fill image; and display, on the display, the transformed image of the physical environment.

19. The non-transitory memory of claim 18, wherein the plurality of previously captured images of the physical environment includes a set of images captured periodically.

20. The non-transitory memory of claim 18, wherein the plurality of previously captured images of the physical environment are stored at a lower resolution than the current image of the physical environment.

\* \* \* \* \*